US010017212B2

(12) United States Patent
Cassiani

(10) Patent No.: US 10,017,212 B2
(45) Date of Patent: Jul. 10, 2018

(54) MOVABLE LOADING FLOOR FOR A MOTOR VEHICLE TRUNK

(71) Applicant: FCA ITALY S.p.A., Turin (IT)

(72) Inventor: Aldo Cassiani, Turin (IT)

(73) Assignee: FCA ITALY S.p.A., Turin (IT)

( * ) Notice: Subject to any disclaimer, the term of this patent is extended or adjusted under 35 U.S.C. 154(b) by 0 days.

(21) Appl. No.: 14/946,942

(22) Filed: Nov. 20, 2015

(65) Prior Publication Data

US 2016/0144903 A1    May 26, 2016

(30) Foreign Application Priority Data

Nov. 21, 2014  (IT) .............................. TO2014A0962

(51) Int. Cl.
*B62D 43/00* (2006.01)
*B62D 25/20* (2006.01)
*B60R 11/00* (2006.01)
*B60R 13/01* (2006.01)

(52) U.S. Cl.
CPC .......... *B62D 25/2054* (2013.01); *B60R 11/00* (2013.01); *B60R 13/013* (2013.01)

(58) Field of Classification Search
CPC ....... B60R 5/044; B60R 11/00; B60R 13/011; B60R 13/013; B60R 13/0268; B60R 13/0275; B62D 25/2054; B62D 43/00; B62D 43/005; B62D 43/10; B65D 5/46; B65D 5/46024; B65D 25/2882;
(Continued)

(56) References Cited

U.S. PATENT DOCUMENTS 2,233,799 A * 3/1941 Seifer ................ B65D 5/46024
229/117.22
4,176,423 A * 12/1979 Wigemark ......... B65D 5/46024
16/405
(Continued)

FOREIGN PATENT DOCUMENTS

CH        370353 A  *  6/1963  ......... B65D 5/46024
DE    2547443 A1  *  4/1977  ........... B65D 5/4608
(Continued)

OTHER PUBLICATIONS

Italian Application TO20140962, Search Report dated Jul. 5, 2015 (6 pages).

Primary Examiner — D Glenn Dayoan
Assistant Examiner — Paul Chenevert
(74) Attorney, Agent, or Firm — Eversheds Sutherland (US) LLP

(57) ABSTRACT

A movable loading floor for a trunk of a motor vehicle has an upper surface, defining a support for luggage or other objects, and a lower surface adapted to be arranged in a position facing a bottom floor of the trunk. The loading floor is provided with a rear portion having a through opening, which has a size and shape for allowing a user to insert a hand into the through opening for grasping the rear portion. The loading floor is provided with a band which, in an inoperative configuration, closes the through opening. At least one rear portion of the band is elastically deformable so as to downwardly deform under the pressure of the hand of the user and therefore to define a passage with respect to a rear edge of the through opening.

15 Claims, 2 Drawing Sheets

(58) Field of Classification Search
CPC ............... B65D 25/2894; B65D 25/30; B65D 2501/24509; B65D 2501/24541; B65D 2519/00791
See application file for complete search history.

(56) References Cited

U.S. PATENT DOCUMENTS

| | | | | |
|---|---|---|---|---|
| 4,801,169 A * | 1/1989 | Queen | .................... | B60R 13/01 |
| | | | | 296/39.1 |
| 5,056,846 A * | 10/1991 | Tanaka | .................... | B60R 5/04 |
| | | | | 292/83 |
| 5,307,982 A * | 5/1994 | Swindell | ............ | B65D 5/46024 |
| | | | | 229/117.19 |
| 5,797,528 A * | 8/1998 | McDuffie | ............... | A01K 97/06 |
| | | | | 150/154 |
| 5,934,502 A * | 8/1999 | Lira | ................ | B65D 25/30 |
| | | | | 220/770 |
| 5,941,408 A * | 8/1999 | Sherman | .................. | A45C 3/04 |
| | | | | 220/495.01 |
| 6,014,850 A * | 1/2000 | LeMire | .................... | B31B 1/86 |
| | | | | 220/754 |
| 6,518,883 B1 * | 2/2003 | Benard | .................. | E05B 79/06 |
| | | | | 307/10.2 |
| 6,948,616 B2 * | 9/2005 | Gillani | ................. | B65D 5/4216 |
| | | | | 206/459.5 |
| 7,597,372 B2 * | 10/2009 | Nagamoto | .............. | B62D 43/06 |
| | | | | 296/37.1 |
| 8,256,815 B2 * | 9/2012 | Tosco | ........................ | B60R 5/04 |
| | | | | 296/24.44 |
| 8,579,346 B2 * | 11/2013 | Schaefer | ................. | E05B 79/06 |
| | | | | 296/1.08 |
| 8,720,969 B2 * | 5/2014 | Young | ....................... | B60R 5/04 |
| | | | | 296/100.01 |
| 9,797,160 B2 * | 10/2017 | Lin | ........................ | E05B 1/0015 |
| 2005/0087530 A1 * | 4/2005 | Svenson | ................... | B60R 7/02 |
| | | | | 220/6 |
| 2009/0166366 A1 * | 7/2009 | Kaneko | ................. | B65D 25/30 |
| | | | | 220/676 |
| 2013/0256498 A1 * | 10/2013 | Antonioni | ............. | F16M 13/00 |
| | | | | 248/560 |
| 2015/0158636 A1 * | 6/2015 | Hoedebeck | ............ | B65D 31/10 |
| | | | | 383/17 |
| 2017/0144792 A1 * | 5/2017 | Block | .................. | B65D 5/0005 |

FOREIGN PATENT DOCUMENTS

| | | | | |
|---|---|---|---|---|
| DE | 102009011670 A1 | 10/2009 | | |
| DE | 102012022974 A1 * | 5/2014 | ............ | B65D 25/30 |
| EP | 1736365 A1 | 5/2006 | | |
| EP | 2522550 A1 | 5/2011 | | |
| EP | 2767483 A2 * | 8/2014 | ............ | B65D 15/22 |
| GB | 1573504 A * | 8/1980 | ............ | B65D 25/14 |
| JP | 04187920 A * | 7/1992 | | |

* cited by examiner

US 10,017,212 B2

MOVABLE LOADING FLOOR FOR A MOTOR VEHICLE TRUNK

CROSS-REFERENCE TO RELATED APPLICATIONS

This application claims priority under 35 U.S.C. 119(a) to Italian Application TO2014A000962 filed Nov. 21, 2014, the subject matter of which is expressly incorporated herein by reference in its entirety.

The present invention relates to a movable loading floor for a motor vehicle trunk.

BACKGROUND OF THE INVENTION

Motor vehicles provided with a trunk having a horizontal loading floor are known. The loading floor can be height-adjusted between a lowered position, adjacent to a bottom surface of the trunk, and a raised position in which the trunk is divided into an upper space and a lower space. In the raised position, the loading floor can then be rotated upwardly to access the lower space below.

To raise/lower the loading floor in the desired position and/or to rotate it upwards, it is necessary to grasp a handle forming part of the loading floor itself. In some solutions, the handle is constituted by a simple frame substantially rectangular in shape, fixed to a rigid panel which defines a surface for supporting objects (luggage, in particular).

Such frame defines an opening which can be engaged by a hand of the user. In this way, after having inserted the hand into the opening, the user grasps a portion of the loading floor with such hand, so as to easily rotate the loading floor upwardly.

Although very simple, the above solution has some drawbacks.

In particular, the handle opening reduces the aesthetic appeal of the trunk and, in general, tends to allow visibility for the contents in the lower space of the trunk when the loading floor is arranged in its raised position. In addition, small objects can accidentally fall into the lower space of the trunk through the handle opening, so that is necessary to move the luggage and lift the loading floor to retrieve them.

SUMMARY OF THE INVENTION

The object of the present invention is to provide a movable loading floor for a motor vehicle trunk, which allows to solve in a simple and inexpensive manner the disadvantages set forth above.

According to the present invention, a movable loading floor for a motor vehicle trunk is provided.

BRIEF DESCRIPTION OF THE DRAWINGS

For a better understanding of the present invention a preferred embodiment is now described, purely by way of non-limiting example, with reference to the accompanying drawings, wherein.

DETAILED DESCRIPTION OF THE INVENTION

Figure 1:
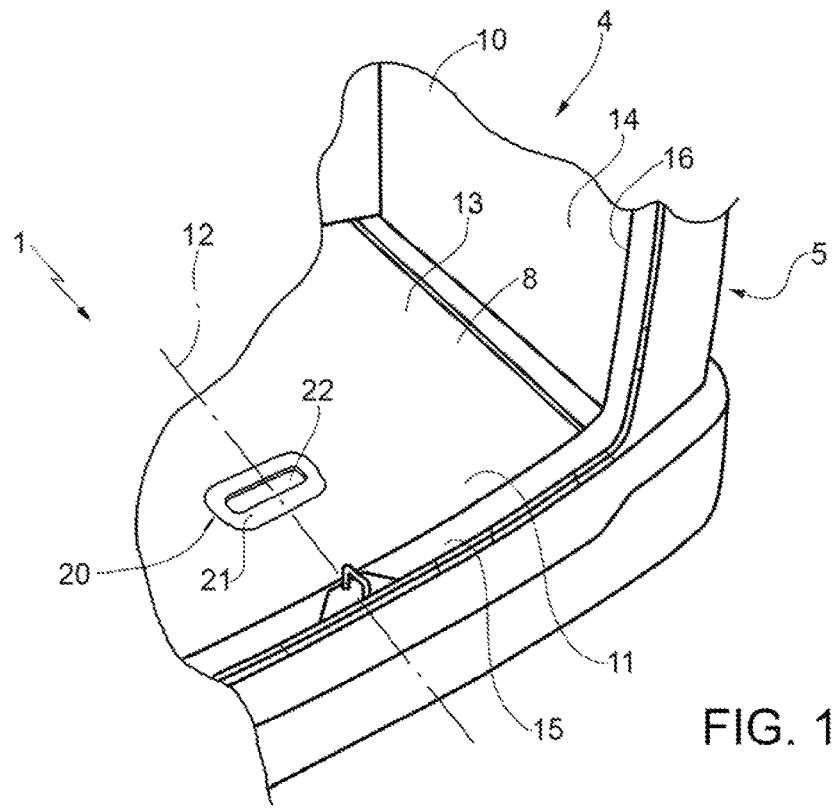
FIG. 1 illustrates in perspective and with parts removed for clarity, a preferred embodiment of the movable loading floor for a motor vehicle trunk according to the present invention.

In FIG. 1, the reference number 1 indicates, as a whole, a movable loading floor (partially illustrated) for a trunk 4 of a motor vehicle 5 (also partially illustrated). The loading floor 1 is completely housed inside the trunk 4 and has an upper surface 8, defining a support for luggage or other objects, and a lower surface 9 (FIG. 2) facing a bottom floor (not illustrated) of the trunk 4.

The position of the loading platform 1 is height-adjustable within the trunk 4. In general, the loading floor 1 may be arranged in a lowered position, adjacent to the bottom floor, and at least one raised position, in which the loading floor 1 is spaced vertically from the bottom floor so as to divide the trunk 4 into two parts. In other words, in the raised position the loading floor 1 divides the trunk 4 in an upper space 10, which is accessible by a user by simply opening a rear hatch (not illustrated) of the motor 5, and in an underlying space, defined between the loading floor 1 and the bottom floor.

In particular, in the raised position, the loading floor 1 defines a well having a rear end portion 11 that can be raised or rotated upwardly by the user to access the underlying space and then reach the objects located below the surface 9. Here and hereinafter, the terms "rear", "front", "frontal", "forward", "backward", etc. . . . are to be understood with respect to the normal travel direction along the longitudinal axis 12 of the motor vehicle 5.

In order to arrange the loading floor 1 in different vertical positions provided in the trunk 4, various handling systems and/or various support systems are already known. In the specific case, the loading floor 1 comprises a panel 13 having a peripheral edge, at least part of which is simply supported on brackets 14 defined by the sides of the trunk 4 and by a rear cross bar 15 defining the lower threshold of the rear opening 16 which is closed by the above mentioned hatch. The sides 14, the cross bar 15, the rear seats of the motor vehicle 5 and/or any retaining systems (not illustrated) then allow for maintaining the loading floor 1 horizontally still.

The loading floor 1 comprises a handle 20, which comprises, in turn, a frame 21 coupled in a fixed position to the panel 13, at the portion 11.

Figure 2:
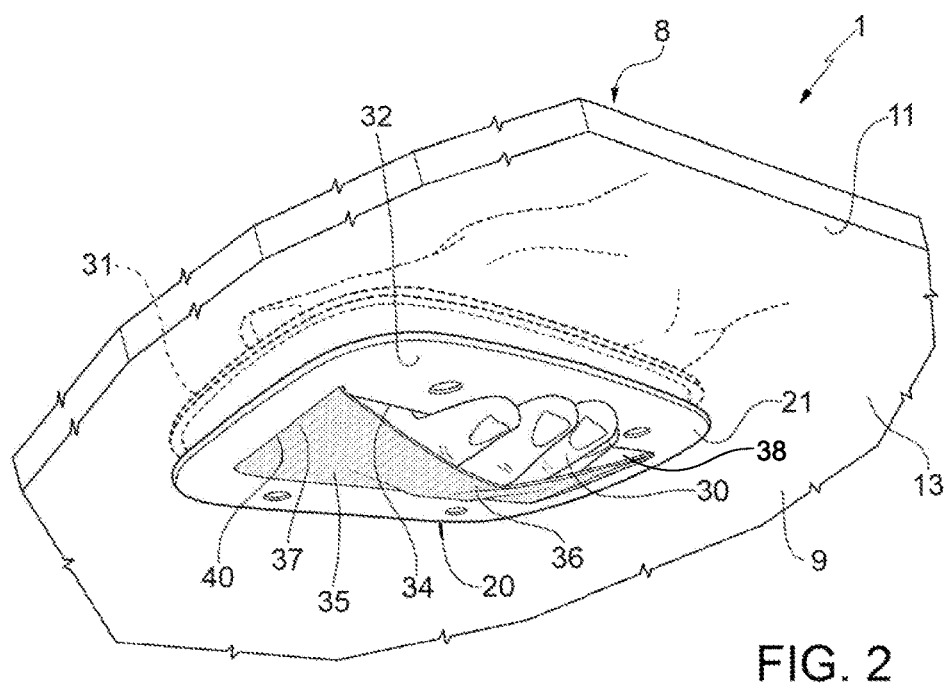
FIG. 2 is a perspective from below, in enlarged scale, of a detail of the loading floor of FIG. 1, during a manual operation by a user.
Figure 3:
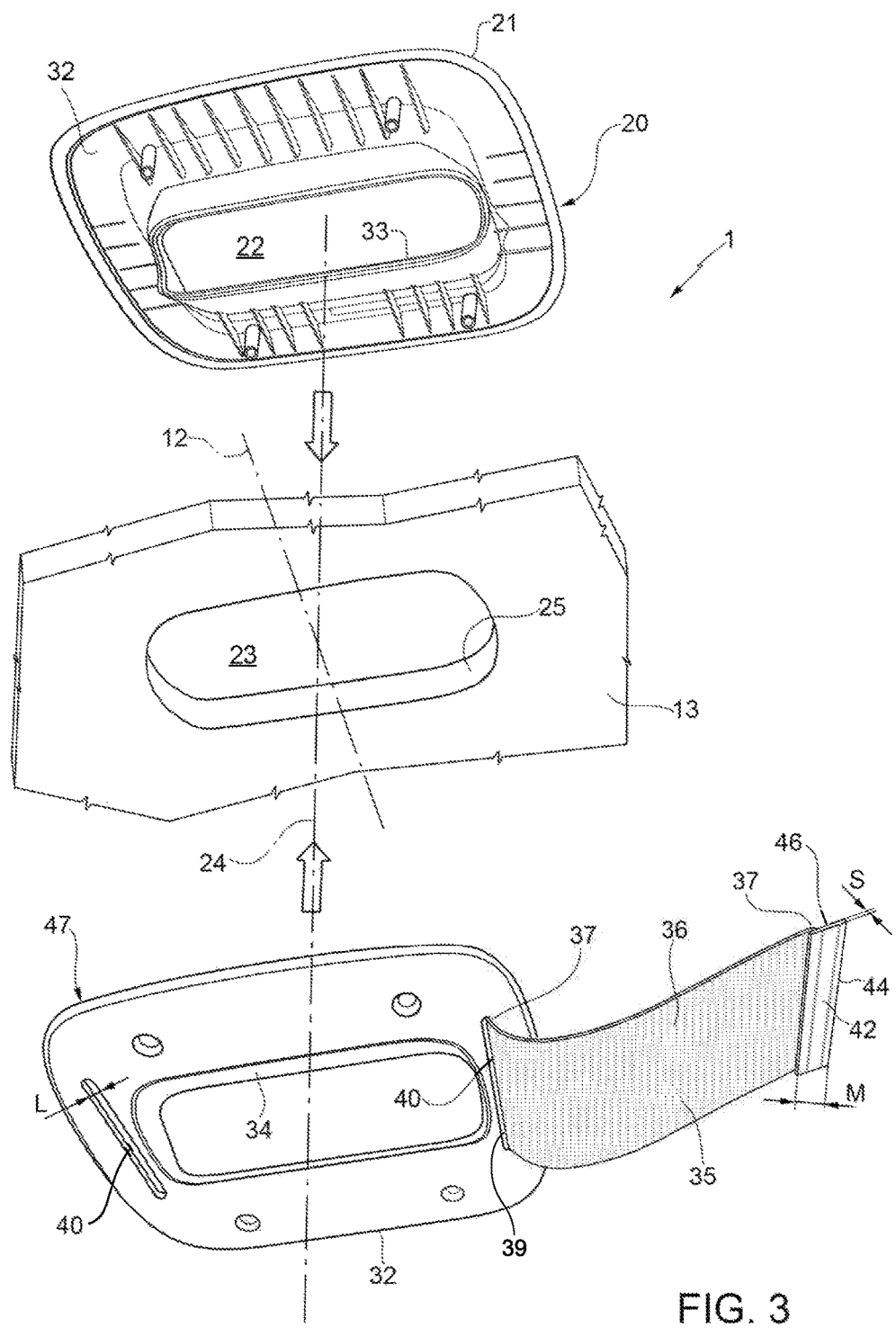
FIG. 3 is a different perspective from below showing, in exploded view, the components visible in the detail of FIG. 2.

With reference to FIGS. 2 and 3, seen in plan view (i.e. seen along an axis orthogonal to the panel 13), the frame 21 has an annular shape, for example quadrangular with rounded vertices, so as to define an opening 22 which is concentric with a seat 23 of the panel 13 along an axis 24 perpendicular to the panel 13. The opening 22 and the seat 23 are through along the axis 24, from the upper surface 8 to the lower surface 9. Preferably, the opening 22 is smaller than the seat 23, whereby the frame 21 covers an edge 25 of the seat 23 so as to hide such edge 25. As seen in FIG. 2, the opening 22 is designed to be crossed by the fingers of a hand 30 of the user, to enable the hand 30 itself to grasp the portion 11 and thus to easily handle the loading floor 1.

Advantageously, the frame 21 is constituted by an upper element 31 and by a lower element 32, which are coaxial along the axis 24 and are arranged, respectively, above and below the panel 13. The elements 31, 32 are fixed to one another and/or to the panel 13, in a manner not described in detail. In particular, the two arrows visible in FIG. 3 indicate the directions in which the elements 31, 32 are coupled to the panel 13 during assembly of the handle 20.

With continued reference to FIG. 3, the frame 21 comprises a front wall 33 and a rear wall 34, which face each other along the axis 12 so as to delimit the opening 22 and cover, respectively, the front and rear sides of the edge 25. Preferably, at least one of the walls 33, 34 is inclined with respect to the axis 24 with a rearward facing orientation, leading from top to bottom, so as to improve the grip of the portion 11 with the hand 30 while the user is in front of the trunk 4. In particular, the wall 33 constitutes part of the upper element 31, and the rear wall 34 constitutes part of the lower element 32.

According to one aspect of the present invention, the handle comprises a band 35, which is coupled to the frame 21 and/or to the panel 13, is preferably made of stretchable fabric and, in an inoperative configuration, completely closes the opening 22, so as to isolate the upper space 10 from the underlying space when the loading floor 1 is arranged in the raised position. The band 35 comprises a rear end portion 36, which is arranged at the rear wall 34 and is elastically deformable: in this way, under the pressure of the fingers of the hand 30, the rear end portion 36 stretches and deforms downwardly defining a passage 38 with respect to the rear edge of the opening 22, i.e. with respect to the rear wall 34. The passage 38 allows the tip of such fingers to pass below the frame 21 and to rest on the lower surface 9 (FIG. 2).

Advantageously, the elasticity of the band 35 is uniform, i.e. not concentrated at the portion 36. Preferably, in addition to the portion 36, also the front edge of the band 35 is unrestrained (i.e. not fixed directly to the frame 21 and/or to the panel 13). Thanks to these characteristics, the band 35 has ample freedom to deform under the pressure of the hand 30.

In the particular example illustrated, the band 35 comprises two lateral ends 37 which are opposite one another and are coupled to the lower element 32 by means of a connecting device 39, so as to close the lower end of the opening 22. In particular, the device 39 comprises two holes formed through the lower element 32 on opposite sides of the opening 22. In particular, such holes are defined by respective elongated slits 40 parallel to the axis 12. The device 39 also comprises two plates 42 of relatively rigid material (only one of which is visible in FIG. 3) fixed respectively to the ends 37. The slits 40 have a width L which is slightly greater than the thickness S of the plates 42, in order to insert a lateral edge 44 of the plates 42 in the slits 40 during the assembly of the handle 20, by manually acting from below. After passing completely through the slits 40, the plates 42 are rotated about 90°, so as to support a face 46 of the plates 42 themselves against an inner surface 47 of the lower element 32. The width L of the slits is less than the width M of the faces 46, whereby the plates 42 remain locked within the frame 21.

According to alternatives not illustrated, the holes 40 and the plates 42 have shapes and/or sizes different from those shown by way of example, but always such as to allow the insertion of an edge of the plates 42 and to prevent the exit thereof after the plates 42 have been rotated about 90°.

Preferably, the length of the band 35 (i.e. the distance between the plates 42) is set as a function of the distance between the slits 40 so as to obtain a light tension of the band 35 itself in the rest configuration.

According to an alternative not illustrated, the band 35 is coupled directly to the panel 13, and not to the frame 21. In this case, the loading floor 1 could possibly be devoid of the frame 21, whereby the seat 23 defines a visible opening where the hand 30 can be inserted.

From the foregoing it is evident how the band 35 allows to obstruct the view through the openings 22, 23 and provides a fine aesthetic aspect to the loading floor 1.

At the same time, small objects entering into the opening 22 do not fall into the underlying space, but are stopped on the band 35, whereby they can be easily collected, without having to move the loading floor 1.

At the same time, the grip of the handle 20 and/or of the portion 11 by the hand 30 of the user is absolutely not compromised with respect to what happens in the known solutions without the band 35.

The mounting of the handle 20 is then very simple, as well and especially regarding the coupling of the end 37 to the frame 21.

Other advantages have been described above, or are readily derivable from the features described above for a technician in the field.

It is, finally, clear that the loading floor 1 described and illustrated here can be modified and varied without thereby departing from the protective scope of the present invention, as defined in the appended claims.

In particular, as mentioned above, the number, shape, size and/or the coupling mode of the components of the handle 20 may be different from what above stated by way of example.

In addition, the loading floor 1 may have a more complex structure with respect to that described above, which provides one single panel 13.

Finally, the ends 37 of the band 36 may be fixed to the frame and/or to the panel 13 in a different way than that provided with the device 39.

The invention claimed is:

1. A movable loading floor for a trunk of a motor vehicle; the loading floor having an upper surface, defining a support for luggage or other objects, and a lower surface adapted to be arranged in a position facing a bottom floor of said trunk; the loading floor comprising a rear portion having a through opening, which has a size and shape for allowing a user to insert a hand through said through opening for grasping said rear portion;
   characterized by comprising a band, which, in an inoperative configuration, closes said through opening; at least one rear portion of said band being elastically deformable so as to downwardly deform under the pressure of said hand and therefore to define a passage with respect to a rear edge of the said through opening, wherein the band is a stretchable fabric band.

2. The loading floor according to claim 1, characterized in that said band is uniformly elastic.

3. The loading floor according to claim 1, characterized in that said band is arranged at a lower end of said through opening.

4. The loading floor according to claim 3, characterized in that said band has a front edge, which is opposite to said rear portion and is unrestrained.

5. The loading floor according to claim 1, characterized by comprising:
   at least one panel having a seat concentric with said through opening along an axis;
   a handle comprising a frame, which is fixed to said panel and defines said through opening;
   connecting means which couple said band directly to said frame.

6. The loading floor according to claim 5, characterized in that said connecting means comprise:

two holes, which are made through said frame and on opposite sides of said through opening; and two plates, which are relatively rigid and are fixed to respective lateral ends of said band;

the shape and size of said holes and of said plates are such so as to allow the insertion of an edge of said plates into said holes and prevent the exiting of said plates after said plates have passed through the holes and have been rotated by about 90°.

7. The loading floor according to claim 5, characterized in that said frame is constituted by an upper element and by a lower element, which are aligned along said axis and are arranged, respectively, above and below said panel.

8. The loading floor according to claim 5, characterized in that said frame comprises a front wall and a rear wall, which face each other so as to delimit frontwardly and rearwardly said through opening and cover an edge of said seat; at least one of said front and rear walls being inclined with respect to said axis with a rearward facing orientation, leading from top to bottom.

9. A movable loading floor for a trunk of a motor vehicle; the loading floor having an upper surface, defining a support for luggage or other objects, and a lower surface adapted to be arranged in a position facing a bottom floor of said trunk; the loading floor comprising:

a rear portion having a through opening, which has a size and shape for allowing a user to insert a hand through said through opening for grasping said rear portion, at least one panel having a seat concentric with said through opening along an axis, a handle comprising a frame, which is fixed to said panel and defines said through opening, wherein said frame comprises a front wall and a rear wall, which face each other so as to delimit frontwardly and rearwardly said through opening and cover an edge of said seat; at least one of said front and rear walls being inclined with respect to said axis with a rearward facing orientation, leading from top to bottom, connecting means which couple said band directly to said frame, and a band, which, in an inoperative configuration, closes said through opening; at least one rear portion of said band being elastically deformable so as to downwardly deform under the pressure of said hand and therefore to define a passage with respect to a rear edge of the said through opening.

10. The loading floor according to claim 9, characterized in that said band is uniformly elastic.

11. The loading floor according to claim 9, characterized in that said band is arranged at a lower end of said through opening.

12. The loading floor according to claim 11, characterized in that said band has a front edge, which is opposite to said rear portion and is unrestrained.

13. The loading floor according to claim 9, characterized by comprising:

at least one panel having a seat concentric with said through opening along an axis;

a handle comprising a frame, which is fixed to said panel and defines said through opening; and connecting means which couple said band directly to said frame.

14. The loading floor according to claim 13, characterized in that said connecting means comprise:

two holes, which are made through said frame and on opposite sides of said through opening; and two plates, which are relatively rigid and are fixed to respective lateral ends of said band;

the shape and size of said holes and of said plates are such so as to allow the insertion of an edge of said plates into said holes and prevent the exiting of said plates after said plates have passed through the holes and have been rotated by about 90°.

15. The loading floor according to claim 13, characterized in that said frame is constituted by an upper element and by a lower element, which are aligned along said axis and are arranged, respectively, above and below said panel.

* * * * *